United States Patent [19]

Hayashi et al.

[11] Patent Number: 5,434,618

[45] Date of Patent: Jul. 18, 1995

[54] ELECTRONIC STILL CAMERA OPERABLE WITH A REMOVABLY MOUNTED STORAGE MEDIUM

[75] Inventors: Kenkichi Hayashi; Seiki Nishi, both of Asaka, Japan

[73] Assignee: Fuji Photo Film Co., Ltd., Kanagawa, Japan

[21] Appl. No.: 255,708

[22] Filed: Jun. 7, 1994

[30] Foreign Application Priority Data

Jun. 7, 1993 [JP] Japan .................................. 5-135560

[51] Int. Cl.⁶ ............................................. H04N 5/76
[52] U.S. Cl. ..................................... 348/231; 348/233; 348/232; 358/909.1
[58] Field of Search ............... 348/207, 222, 231, 232, 348/233; 358/909.1, 906, 909; H04N 5/225, 5/228, 5/76

[56] References Cited

U.S. PATENT DOCUMENTS 5,034,804 7/1991 Sasaki .................... 348/232
5,093,731 3/1992 Watanabe ............... 348/232

Primary Examiner—James J. Groody
Assistant Examiner—Sherrie Hsia

[57] ABSTRACT

In an electronic still camera operable with a memory card or similar storage medium removably mounted thereto, a first controller causes, before a continuous shoot mode or similar mode operation begins, a memory card to develop attributes information particular to and stored in the card to a second controller. The attributes information include one representative of a storing speed available with the card. Then, the first controller selects a clock frequency of a clock signal which matches the storing speed and provides the card with a reference for operation. The first controller generates a clock signal having the clock frequency selected and sends it to the card together with image data representative of a scene. As a result, the image data are written to the card at a speed synchronous to the frequency of the clock signal.

7 Claims, 6 Drawing Sheets

ELECTRONIC STILL CAMERA OPERABLE WITH A REMOVABLY MOUNTED STORAGE MEDIUM

BACKGROUND OF THE INVENTION

1. Field of the Invention

The present invention relates to an electronic still camera operable with a storage medium, e.g., a memory card removably mounted thereto and loaded with a semiconductor memory for storing image signals. More particularly, the present invention is concerned with an electronic still camera adaptive to storage media different in, for example, the storing speed of a semiconductor memory flexibly.

2. Description of the Related Art

A still camera has traditionally referred to an apparatus which stores images in a recording medium implemented as a film carrying a silver halide sensitive layer thereon. A recent achievement in the imaging art is an electronic still camera operable with a storage medium in the form of a semiconductor memory card and capable of storing images picked up in the medium in a digital signal format. A memory card applicable to this kind of camera accommodates a semiconductor memory therein as a memory device. While various memory devices different in type and operation characteristic are available today, an EEPROM ( Electrically Erasable Programmable Read Only Memory) is often used since it can store data without resorting to a battery. EEPROMs are generally classified into two types, i.e., a type capable of rewriting data on a byte basis and a type capable flushing away data. The byte-by-byte type EEPROM is not feasible for a memory card having a great capacity since reducing the cell size thereof is difficult, although data can be rewritten on a byte basis. The flush type EEPROM is provided with a collective erasure capability or a partial erasure capability, as needed. In any case, this type of EEPROM implements a memory card having a great capacity since the cells thereof can be made small size. Therefore, for an electronic still camera handling image data which is inherently great in amount, a memory card whose area for storing image data is implemented by a flush type EEPROM is advantageously usable.

However, the memory card using a flush type EEPROM, or flush memory card as referred to hereinafter, has some issues yet to be solved, as follows. The storing speed available with the flush memory card is low, compared to an SRAM (Static Random Access Memory). Further, the service life of this kind of memory card is short, regarding the number of times that data can be written in. Considering such specifications of parts lacking in unity, Japanese Electronic Industry Development Association (JEIDA) is endeavoring to standardize memory cards for use with an electronic still camera. Taking the contents of IC (Integrated Circuit) memory cards for personal computers as a reference for standard specifications, a speed version including operation speeds of 250 nanoseconds (ns), 200 ns, 150 ns, and 100 ns is defined.

Specifically, in a conventional electronic still camera, a memory card of the type described is connected to the camera via a connector built in the camera. As the camera picks up a desired scene, an optical image representative of the scene is focused onto a solid state image sensor by a lens. In response, the image sensor converts the optical image to a corresponding electric signal or image signal. An analog-to-digital converter transforms the image signal to a digital signal, or image data, and delivers it to a signal processing section. The image data undergone image processing, compression and other various kinds of signal processing at this section are transferred to the memory card and written thereto under the control of a controller.

The conventional electronic still camera, however, gives no consideration to the storing speed which differs from one memory card to another memory card. Specifically, a storing speed particular to a memory card is permanently assigned to each camera. For example, even when use is made of a memory card featuring a high storing speed, the camera simply writes image data in the card at the speed assigned thereto. Of course, a memory card whose storing speed is lower than that of the camera cannot be used.

In a continuous shoot mode operation, the speed available for writing data in a memory card determines the interval between continuous shots. This brings about a problem that when the shooting speed representative of the interval between shots is matched to a memory card whose storing speed is low, high-speed continuous shooting cannot be effected. An electronic still camera is a promising implementation for high-speed continuous shooting since it does not need, for example, the traditional mechanism for rolling up a film. However, the problem stated above prevents the camera from exhibiting such a capability sufficiently. Although a memory card having a high storing speed may be mounted to the camera, the characteristic or the effect particular to the card is not available since the continuous shooting speed of the camera itself is not variable.

SUMMARY OF THE INVENTION

It is, therefore, an object of the present invention to provide an electronic still camera adaptive to memory cards each having a particular storing speed flexibly, and capable of shooting scenes while making most of the characteristic of each card.

In accordance with the present invention, an electronic still camera operable with a storage medium, which is removably mounted to the camera for storing data and includes a semiconductor memory device, comprises an imaging section for picking up an object and producing image data representative of the object, a processing section for processing the image data produced by the imaging section to convert them to image data capable of being written to the storage medium, a storage for temporarily storing the image data processed by the processing section, a first controller for controlling the processing means and storing section such that the image data processed by the processing section and then-stored in the storage are written to the storage medium, and a second controller for commanding the first controller to read attributes information representative of the attributes of the storage medium out of the medium and execute operation control matching the attributes information. The first controller controls, in response to a command from the second controller, the shooting operation of the camera and the writing of the image data in the storage medium.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENT

Figure 5:
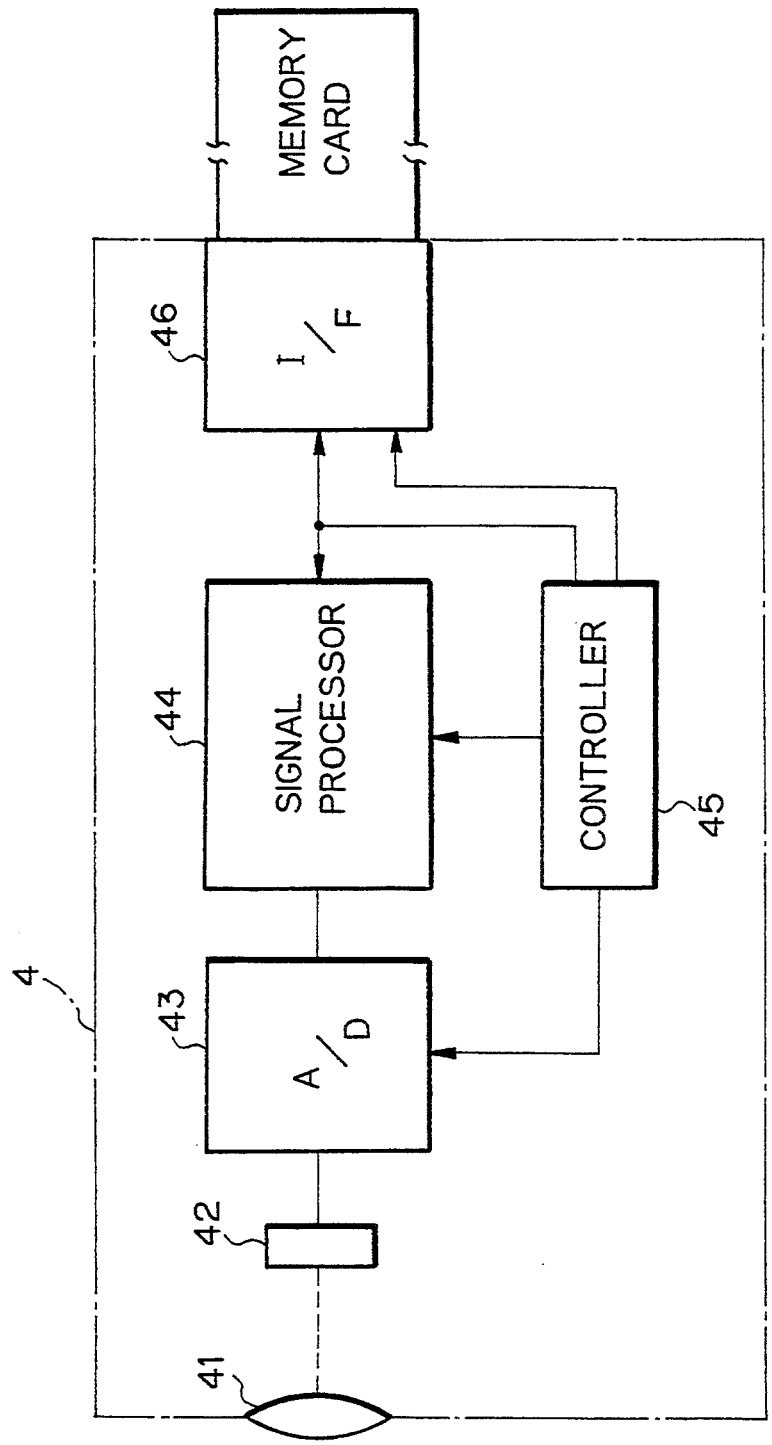
FIG. 5 is a block diagram schematically showing a conventional electronic still camera.

To better understand the present invention, a brief reference will be made to a conventional electronic still camera operable with a memory card, shown in FIG. 5. As shown, the camera, generally designated by the reference numeral 4, has an interface (I/F) 46. A memory card is removably connected to the camera 4 via a connector built in the I/F 46. When the camera 4 is manipulated to shoot a desired scene, the resulting optical image is focused onto a solid state image sensor 42 by a lens 41. Implemented by CCDs (Charge Coupled Devices), the image sensor 42 transforms the incident optical image to a corresponding analog electric signal. The analog signal, or image signal, is converted to a digital signal, or image data, by an analog-to-digital converter (ADC) 43. A signal processor 44 executes various kinds of processing, including compression, with the image data. The processed image data are transferred from the signal processor 44 to the memory card via the I/F 46 and written to the storage area of the card. The ADC 43, signal processor 44 and I/F 46 are controlled by a controller 45. The conventional camera 4 having such a construction has the problems discussed earlier.

Figure 1:
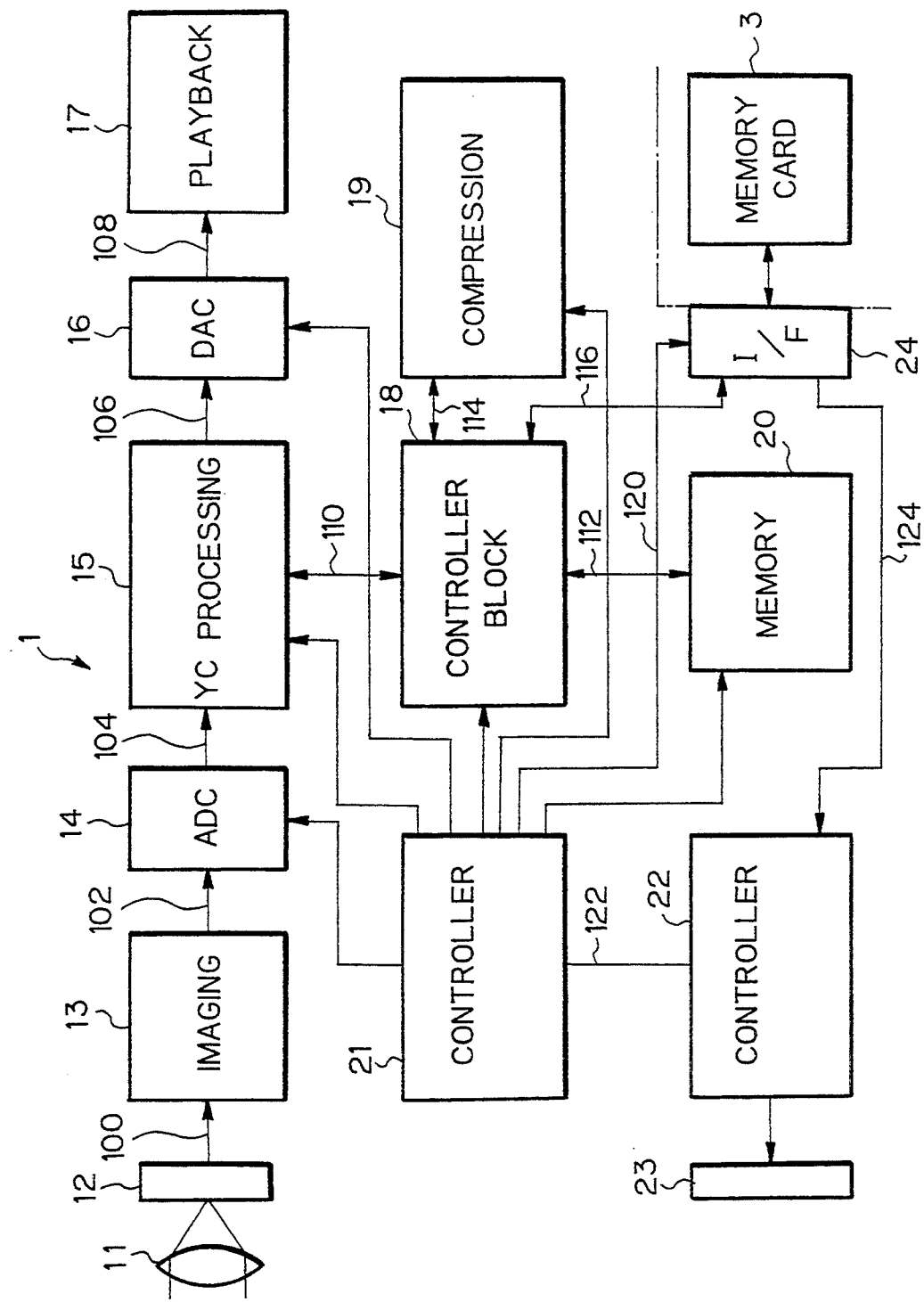
FIG. 1 is a block diagram schematically showing an electronic still camera embodying the present invention.

Referring to FIG. 1, an electronic still camera embodying the present invention is shown and generally designated by the reference numeral 1. As shown, the camera 1 has a playback section 17 for reproducing, as a still picture, an electric signal representative of a scene picked up via a lens 11. When a memory card 3 is removably mounted to the camera 1, the camera 1 is capable of compressing image data represented by the electric signal and storing them in the card 3. The memory card 3 is a semiconductor memory device capable of storing digital image data transferred from the camera, or host, 1 or sending an image signal to the host 1, as needed.

Specifically, the lens 11 focuses an optical image representative of the scene onto a CCD image sensor 12. The image sensor 12, like the image sensor 42 shown in FIG. 5, produces an image signal on the output 100 thereof and delivers it to an imaging section 13. The imaging section 13 subjects the input image signal to amplification, white balance adjustment, tone correction and other conventional preprocessing. The processed image signal is fed from the imaging section 13 to an ADC 14 via an output 102. The ADC 14 transforms the analog image signal fed thereto to a digital signal, i.e., image data. The ADC 14 has an output 104 connected to a YC processing block 15. The YC processing block 15 converts the input image data to a data format consisting of luminance data Y and chrominance data R-Y and B-Y. The YC processing block 15 is connected to a digital-to-analog converter (DAC) 16 via an output 106 thereof. The DAC 16 transforms the image data from the block 15 to an analog image signal. The analog image signal is fed from the DAC 16 to the playback section 17 via an output 108. In response, the playback section 17 converts the image signal to a signal matching in format to a monitor or similar display. On receiving the image signal, the display shows a still picture represented by the image signal thereon.

A controller block 18 selects, under the control of a first controller 21 which will be described, a particular image data transfer path terminating at a desired circuit. When the image data provided with a predetermined format by the YC processing block 15 are fed to the controller block 18 over a connection line 110, the block 18 transfers them to a memory 20 over a connection line 112. The memory 20 comprises a frame memory and stores the image data appearing on the input 112 thereof. Also, the memory 20 produces, under the control of the controller 21, image data stored therein on the output 112. These data are routed through the controller block 18 to a compressing block 19 via the output 114 of the controller block 18. The compressing block 19, also controlled by the controller 21, executes bidimensional orthogonal transform, normalization, and Huffman coding or similar compression coding with the input image data. An I/F 24 is connected to another output 116 of the controller block 18. The compressed image data from the compressing block 19 are delivered through the controller block 18 to the I/F 24. The I/F 24 is provided with a connector for connecting the camera 1 to the memory card 3 removably mounted thereto. In this configuration, the image data from the controller block 18 are transferred to the card 3 together with control signals from the controller 21. On the other hand, image data from the card 3 are transferred to the controller block 18.

The controller 21 generates a clock signal which the card 3 uses as a reference for operation, and control signals for driving the card 3. The clock signal and control signals are fed to the I/F 24 via an output 120. The image data from the controller block 18 are written to the card 3 via the I/F 24 in synchronism with the clock signal.

On receiving a command from a second controller 22 which will also be described, the controller 21 reads information particular to and stored in the card 3 which is connected to the I/F 24. Specifically, as the controller 21 receives a command from the controller 22 via an input 122, it reads various kinds of attributes information representative of the attributes of the card 3 out of the card 3. The attributes include a storing speed, the kind of a memory device, and a storage capacity. At this instant, by controlling the I/F 24, the controller 21 causes it to transfer the attributes information read out of the card 3 to the controller 22 over a connection line 124. As the controller 22 informs the controller 21 of the attributes of the card 3, the controller 21 generates a clock signal whose frequency matches the storing speed of the card 3. The controller 21 sends the clock signal and control signals to the card 3 via the I/F 24, thereby controlling the writing or reading of image data in or out of the card 3. At the same time, by controlling the controller block 18, compressing block 19 and memory 20, the controller 21 drives them at a rate corresponding to the clock signal so as to produce image data stored in the memory 20 on the output 116.

The second controller 22 commands, on identifying the storing speed and other attributes of the card 3 connected to the I/F 24, the first controller 21 to select a clock frequency matching the identified storing speed and output a clock signal having such a frequency. At the same time, by referencing the identified attributes of the card 3, the controller 22 determines whether or not data can be written to the card 3 in the current shoot mode. Further, in the event of continuous shooting, the controller 22 determines a shooting speed and the number of continuous shots available with the card 3. The controller 22 controls the controller 21 on the basis of the results of such decisions, while delivering information representative of the results to a display 23. In response, the display 23 displays information relating to shooting and including the kind of the card 3, whether or not recording is allowed and the number of continuous shots available. In addition, when a trouble occurs, for example, during shooting, the display 23 displays an error message for alerting a person operating the camera 1 to the trouble.

Figure 2:
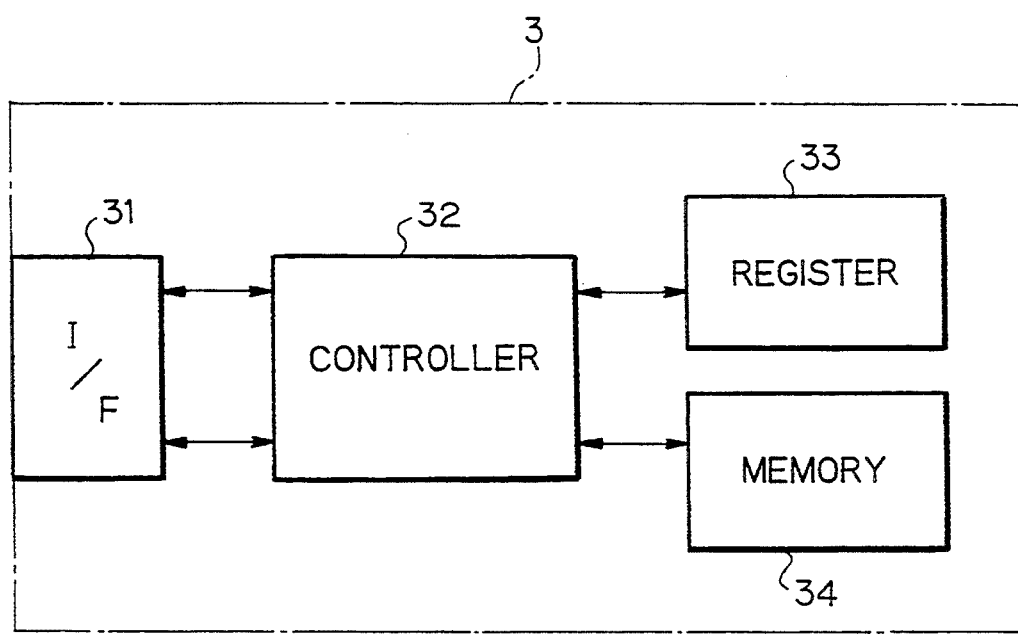
FIG. 2 is a schematic block diagram showing the construction of a memory card applicable to the embodiment.
Figure 3:
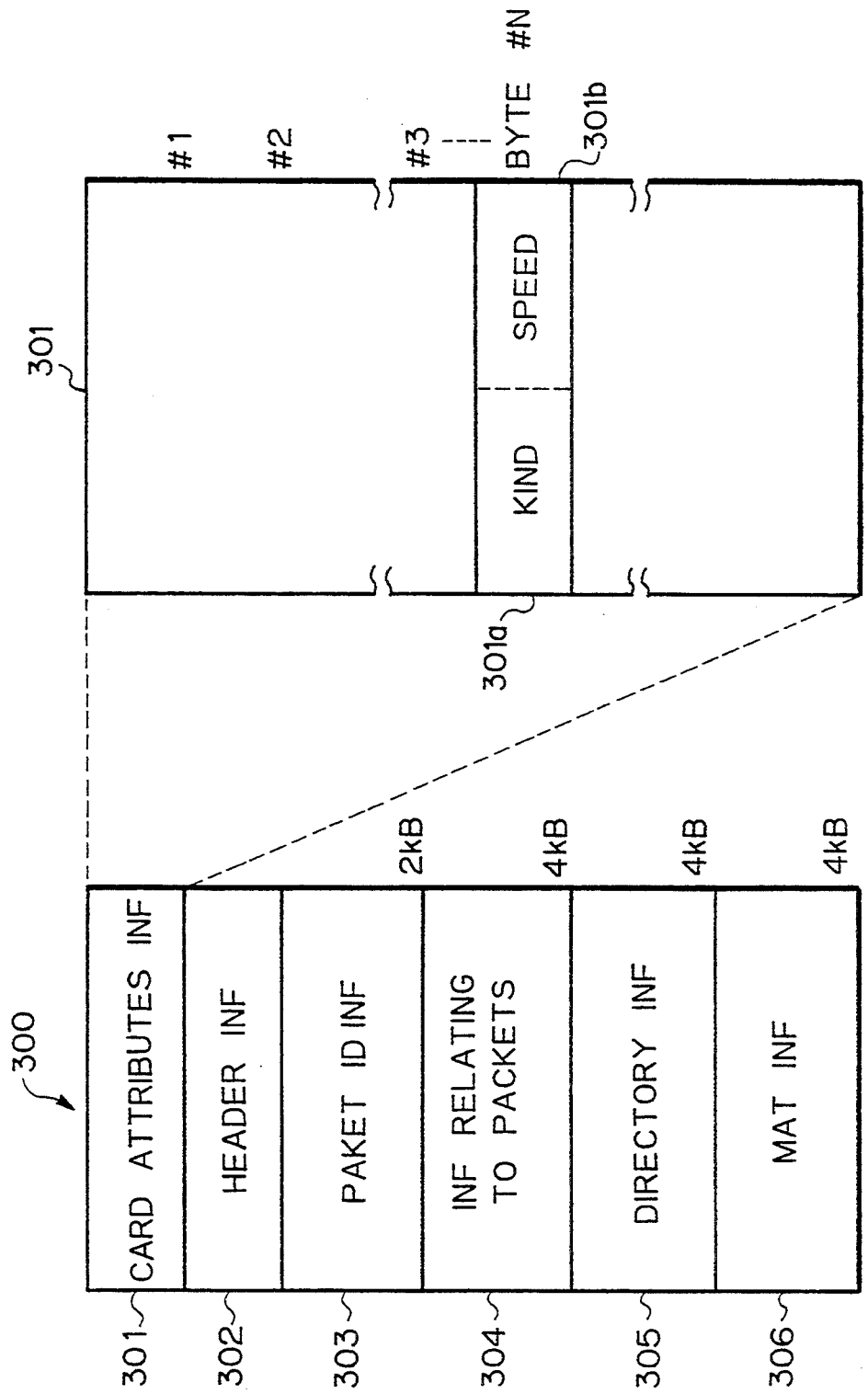
FIG. 3 shows a specific format in which supervisory information are stored in the memory card of FIG. 2.

As shown in FIG. 2, the memory card 3 removably mounted on the camera 1 is generally made up of an I/F 31, a controller 32, a register 33, and a memory 34. The image data, clock signal and control signals sent from the camera 1 are routed through the I/F 31 to the controller 32. In response, the controller 32 writes the image data in the memory 34 in synchronism with the received clock signal. The information particular to the card 3, i.e., attributes are stored in the storage area of the register 33 beforehand. As shown in FIG. 3 specifically, the storage area of the card 3 includes a supervisory area 300 which is logically divided into a plurality of areas, i.e., six areas 301–306 in the embodiment. Information stored in, among the areas 301–306, the attribute information area 301 are stored in the register 33.

The supervisory area 300 of the card 3 stores information for supervising image data written to a data area, not shown, which is also formatted in the card 3. Specifically, supervisory data for writing or reading image data in or out of the memory 34 are stored in the 300. In the supervisory area supervisory area 300, the area 301 stores information representative of the kind and storing speed of the memory device constituting the memory 34, together with other attributes of the card 3. For example, the kind 301a and storing speed 301b of the memory device are stored in the area 301 in a specific format shown in FIG. 3. If the fact that information representative of the kind 301 a and storing speed 301b are stored in the "N" byte, as counted from the first byte of the area 301, is known, the host, or camera, 1 loaded with the card 3 can see them easily. While the area 301 is implemented by the register 33 in the illustrative embodiment, the register 33 may be replaced with an exclusive ROM (Read Only Memory), if desired.

The areas 302–306 are assigned to the memory 34, FIG. 2. Also assigned to the memory 34 is the data area, not shown, for storing image data sent from the camera 1. The area 302 stores header information indicative of the used locations, idle locations and other locations of the data area. The area 303 stores packet identification (ID) information indicative of the kind and state of data, i.e., video data or audio data stored in the data area. The area 304 stores information relevant to packets, i.e., representative of image data other than, but relating to, image data stored in the data area. The area 305 stores directory information representative of the locations of image data existing in the data area. Further, the area 306 stores MAT (Memory Allocation Table) information indicative of the relation between image data existing in the data area.

The card 3 is mounted to the camera 1 or similar host and interchanges signals with the host 1 via a connector built in the I/F 31, FIG. 2. The connector of the card 3 has idle pins thereof short-circuited to allow the host 1 to detect the card 3 when the latter is mounted to the former. Specifically, if the host 1 applies a voltage signal to one of two short pins thereof and senses the signal via the other short pin, it can see if the card 3 has been connected thereto or not.

Figure 4A:
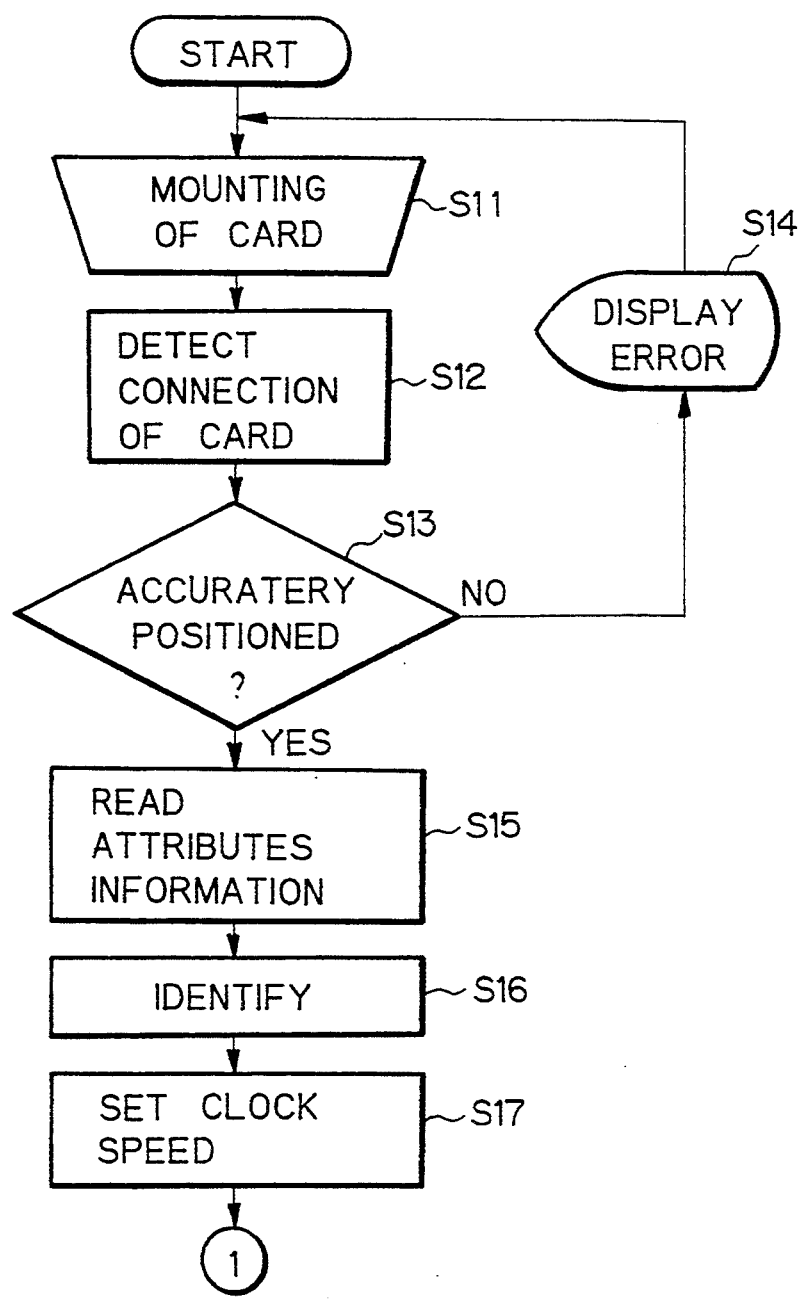
FIGS. 4A and 4B are a flowchart demonstrating a specific operation of the embodiment.
Figure 4B:
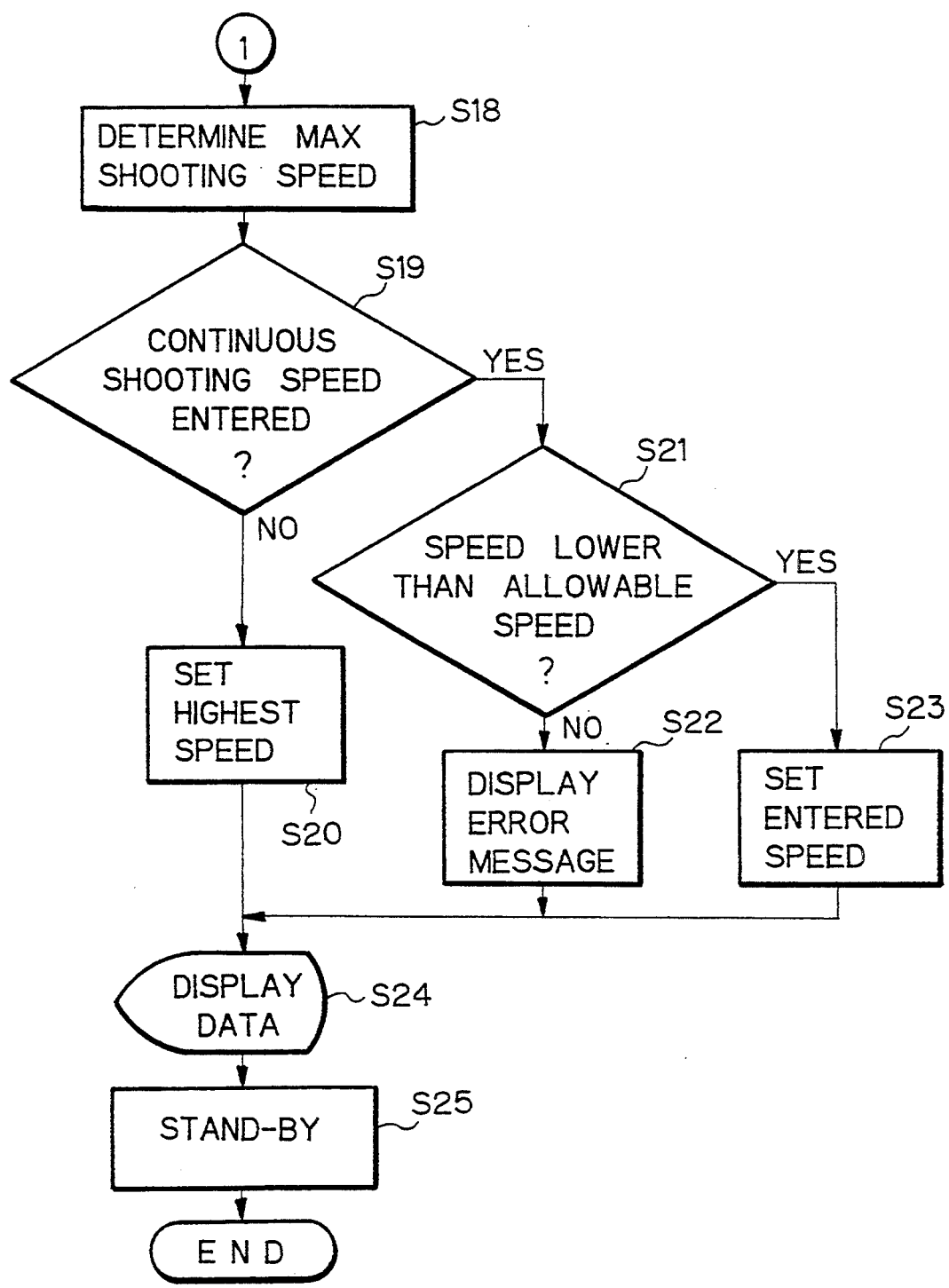

A reference will be made to FIGS. 4A and 4B for describing how the camera identifies the attributes of the memory card 3 mounted thereto and sets up a shooting speed and other conditions matching the identified attributes. To begin with, the card 3 is mounted to the camera 1 (step S11). Then, the camera 1 detects the connection of the card 3 via the short pins thereof (step S12) and, at the same time, determines whether or not the connection is accurate (step S13). If the connection is not accurate (NO, step S13), the camera 1 displays an error message on the display 23 (step S14), thereby urging the operator to position the card 3 accurately. If the connection is accurate (YES, step S13), the controller 21 of the camera 1 produces on the output 120 thereof a control signal for reading the attributes information stored in the area 301 of the card 30 and the supervisory data stored in the areas 302–306, and a clock signal. The control signal and clock signal are sent to the controller 32 of the card 3 via the I/Fs 24 and 31. As a result, the attributes information of the card 3 and the supervisory data are read out of the card 3 and sent to the controller 22 of the camera 1 via the I/Fs 31 and 24 and input 124 (step S15).

On receiving the attributes information and supervisory data from the card 3, the controller 22 determines, based on the attributes information, the kind and storing speed of the memory device constituting the memory 34 of the card 3. At the same time, the controller 22 identifies idle memory locations available in the memory 34 by referencing the supervisory data. This part of the procedure is collectively represented by a step S16. Subsequently, the controller 22 determines, based on the storing speed of the card 3, whether or not data can be written to the card 3 in the current shoot mode and, in the event of continuous shooting, a shooting speed and the number of continuous shots available. The controller 22 sets up a clock rate to be sent to the card 3 on the basis of the results of such decisions (step S17). The results of decisions are delivered from the controller 22 to the controller 21 and display 23. In response, the controller 21 determines a maximum shooting speed matching the clock frequency (step S18).

In a step S19, whether or not the operator has entered a desired continuous shooting speed on the camera 1 is determined. If the operator has not entered it (NO, step S19), the controller 21 sets up the highest shooting speed, generates a clock signal matching the highest shooting speed, and sends it to the card 3 (step S20). If any desired shooting speed has been entered (YES, step S19), whether it is lower than the maximum shooting speed matching the storing speed of the card 3 is determined (step S21). If the desired shooting speed is higher than the maximum shooting speed, i.e., above the capacity of the card 3 (NO, step S21), an error message appears on the display 23 to alert the operator to the improper condition (step S22). If the desired shooting speed is below the capacity of the card 3 (YES, step S21), it is set up (S23). After the shooting speed of the camera 1 has been set up by the above procedure, the number of frames available for a unit interval matching the shooting speed, the maximum number of shots and other information appear on the display 23 (step S24). The operator, watching the display 23, recognizes that the camera 1 is operable, .i.e., it is in a stand-by state (step S25).

By the sequence of steps described above, the camera 1 automatically selects a shooting speed matching a storing speed particular to the card 3. When the operator does not desire a special shooting speed, e.g., high shooting speed for continuous shots, the operator can make most of the functions available with the card 3. When the operator needs a special shooting speed and enters it on the camera 1, the camera 1 determines whether or not the desired speed matches the functions particular to the card 3. In this condition, the operator is capable of shooting a desired scene continuously at the shooting speed set up by the camera 1. For a usual single shot, as distinguished from continuous shots, the camera 1 may be operated at its own speed without regard to the storing speed of the card 3.

In summary, it will be seen that the present invention provides an electronic still camera operable with memory cards different in storing speed flexibly and, therefore, making most of the characteristic of each card. This advantages is derived from a unique configuration wherein one of two controllers commands, based on the attributes of a memory card read out of the card, the other controller to execute operation control matching the ability of the card.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

What is claimed is:

1. An electronic still camera operable with a storage medium which is removably mounted to said camera for storing data and includes a semiconductor memory device, said camera comprising:

imaging means for picking up an object and producing image data representative of said object;
   processing means for processing the image data produced by said imaging means to convert said image data to image data capable of being written to the storage medium;
   storing means for temporarily storing the image data processed by said processing means;
   first control means for controlling said processing means and said storing means such that the image data processed by said processing means and then stored in said storing means are written to the storage medium; and
   second control means for commanding said first control means to read attributes information representative of attributes of the storage medium out of said storage medium and execute operation control matching said attributes information;
   said first control means controlling, in response to a command from said second control means, a shooting operation of said camera and writing of the image data in the storage medium.

2. A camera in accordance with claim 1, wherein said first control means comprises reading means for reading the attributes information out of the storage medium;
   said second control means comprising:
   identifying means for identifying the attributes information read out by said first control means; and
   deciding means for determining, based on the attributes information identified by said identifying means, whether or not the image data can be written to the storage medium by the operation control of said first control means;
   said first control means controlling, based on a result of decision of said deciding means, the shooting operation of said camera and writing of the image data in the storage medium.

3. A camera in accordance with claim 2, wherein said first control means comprises:
   clocking means for selecting and outputting, based on the result of decision of said deciding means, a clock signal for providing the storage medium with a reference for operation; and
   transferring means for transferring the clock signal and the image data to the storage medium.

4. A camera in accordance with claim 1, wherein the attributes information include information representative of a storing speed particular to the semiconductor memory device of the storage medium.

5. A camera in accordance with claim 1, wherein the attributes information include information representative of a kind of the semiconductor memory device of the storage medium.

6. A camera in accordance with claim 1, further comprising display means for displaying information associated with the attributes information, said second control means transferring information represented by said attributes information to said display means.

7. A camera in accordance with claim 1, wherein said first control means further comprises setting means for setting, in a continuous shoot mode, an interval between continuous shots on the basis of the attributes information.

* * * * *